W. M. CARLIN.
PISTON.
APPLICATION FILED AUG. 28, 1920.
1,391,938.
Patented Sept. 27, 1921.
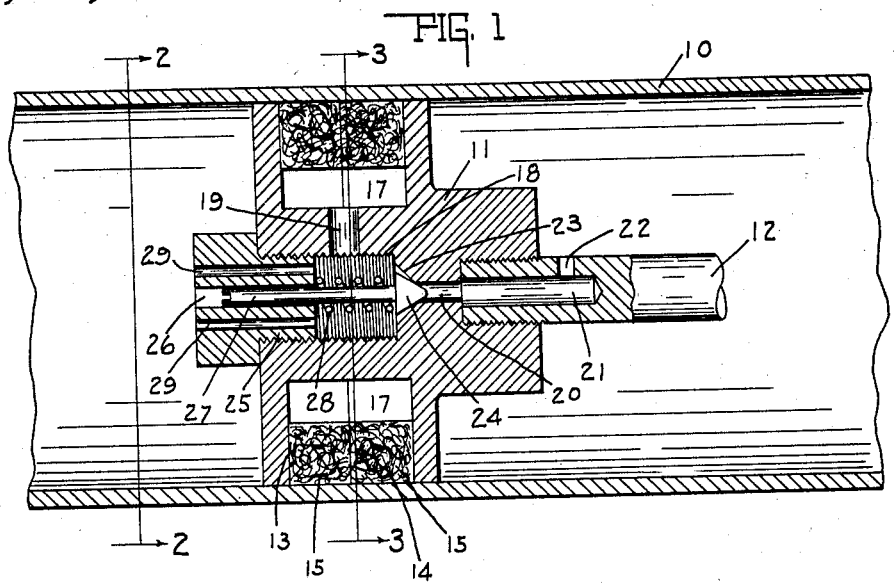
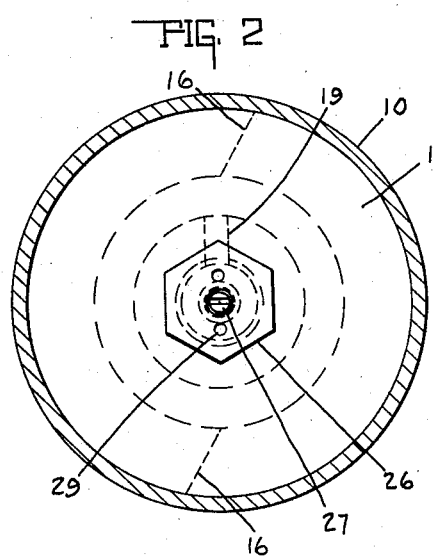
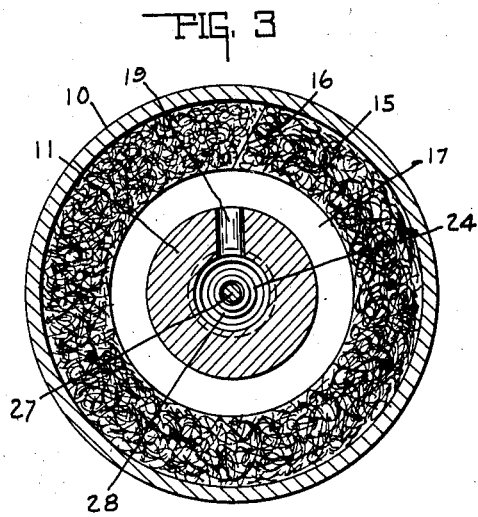
INVENTOR.
WILLIAM M. CARLIN.
BY
ATTORNEYS.

UNITED STATES PATENT OFFICE.

WILLIAM M. CARLIN, OF INDIANAPOLIS, INDIANA.

PISTON.

1,391,938.   Specification of Letters Patent.   Patented Sept. 27, 1921.

Application filed August 28, 1920. Serial No. 406,617.

*To all whom it may concern:*

Be it known that I, WILLIAM M. CARLIN, a citizen of the United States, and a resident of Indianapolis, county of Marion, and State of Indiana, have invented a certain new and useful Piston; and I do hereby declare that the following is a full, clear, and exact description thereof, reference being had to the accompanying drawings, in which like numerals refer to like parts.

This invention relates to pistons and the like wherein piston ring means is provided for preventing leakage between the piston and the cylinder associated therewith, said piston ring means being expansible.

The chief object of this invention is to provide a piston of the general character defined with expansible ring means which is adapted to be expanded during the compression stroke of the piston so as to effectually seal said piston in the cylinder and prevent leakage therebetween thereby increasing the efficiency of the piston.

Another object of the invention is to associate the foregoing expansible leakage ring means with other means associated with the piston such that said last mentioned means is adapted to simultaneously supply fluid to the cylinder and to the means associated with the expansible piston ring; which fluid is compressed by means of the piston and simultaneously therewith said rings are expanded by the compression of said fluid.

The chief feature of the invention consists in providing a piston member which is adapted to compress a fluid so that the piston operates for pumping purposes, said piston being provided with self contained expansible piston leakage rings and said piston further being provided with supply port means and valve means controlling the same whereby in a pump said piston is adapted to function in the foregoing manner thereby eliminating many parts heretofore employed.

The full nature of this invention will be understood from the accompanying drawings and the following description and claims.

In the drawings Figure 1 is a longitudinal sectional view of a pump cylinder and a pump piston, the latter embodying features of the invention, the movable parts of the piston being shown in the positions occupied during the compression stroke thereof: Fig. 2 is a cross sectional view taken on the line 2—2 of Fig. 1 in the direction of the arrows. Fig. 3 is a central cross sectional view taken on the line 3—3 of Fig. 1 and in the direction of the arrows.

In the drawings 10 indicates a pump cylinder and 11 indicates the body portion of a piston supported upon and secured to a piston rod or stem 12. In the drawings the piston and cylinder are preferably shown cylindrical. The piston body portion 11 is provided with an annular groove 13, said groove being adapted to receive and seat an expansible piston ring means 14 associated with the piston. In the present invention said expansible piston ring means comprises a plurality of substantially similar flexible, sectional and arcuate members 15. In the present embodiment each ring section comprises a substantially annular ring member split at 16, as shown in Fig. 3. The faces of said split portion lie in a plane at an angle to the radii of the piston and parallel to the piston axis. In Fig. 2 the dotted lines 16 illustrate the positioning of the plurality of sections shown in Fig. 1, such that the split portions 16 of said sectionalized annular piston ring means do not register. While but two of said sections have been illustrated in the drawings it will be understood that any desired number may be used. It will be further understood that while the preferred form of each circular ring section is composed of a flat split circular ring, said ring may be in other forms such as composed of a plurality of arcuate sections.

Associated with the expansible piston ring means 14 is suitable chamber means 17, said chamber means being formed within the piston body portion 11 and being adapted to receive pressure fluid to expand the expansible piston ring means. In the present and preferred embodiment of the invention, the annular channel or groove 13 is adapted, as shown clearly in Fig. 1, to form said ring expanding chamber which consequently is of annular form. Other suitable chamber means, however, may be used with equal facility, provided that said chamber is adapted to transmit the force of the pressure fluid to the expansible piston ring means.

The piston body portion 11 is recessed at 18 to provide a chamber within the same. Said chamber 18 communicates with the chamber 17 by means of a conduit or channel 19. The chamber 18, in the present invention, is provided with a channel 20, said channel 20 communicating with the outside of the cylinder and is adapted to function as an intake for the pump. In the present invention the piston rod or stem 12 is provided with a channel 21 in its piston support, and communicating therewith is a port 22 open to the atmosphere, whereby, when the channels 20 and 21 register with each other, fluid may be supplied to the interior of the pump cylinder. The junction of the channel 20 with the chamber 18 is preferably tapered or beveled as at 23 to form a valve seat. Associated therewith is a conical valve member 24.

From the foregoing it will be understood that upon the suction stroke of the pump piston the valve 24 is adapted to be removed by the inrushing fluid from the seat 23 thereby permitting said fluid, such as air and the like, to enter through the communicating ports and passages 20 to 22 inclusive and enter the chamber 18, which chamber communicates with the chamber 17 as described as well as the pump cylinder 10 by means hereinafter to be described. Upon the compression stroke of the piston the valve 24, of course, is seated on the valve seat 23. The compression pressure in the pump cylinder is communicated through the chamber 18, port or channel 19 to the chamber 17 and thence from said chamber to the expansible piston ring means to enlarge the same and force said piston rings to conform to the periphery of the interior periphery of the pump cylinder 10.

In order to facilitate the construction of said novel piston and for insuring more efficient operation thereof, the following means is provided. The chamber 18 is interiorly threaded and the communication of said chamber 18 with the pump cylinder 10 is restricted by means of a plug member 25 provided with a head portion 26 in the form of a nut or bolt. The plug 25 is preferably slotted at 26 and slidable in said slot is a stem member 27 carrying upon its free end the valve member 24. Since the stem 27 is of less diameter than the head of the valve 24 it will be understood that the coil spring 28 is adapted to be positioned concentrically of said valve stem and normally maintain the valve member 24 upon the seat 23, the adjustment of said spring being secured by screwing the plug member 25 into or out of the chamber 18 as desired. The channel means provided, such that the chamber 18 may communicate with the pump cylinder 10 to supply fluid to the same, comprises a plurality of supply channels or conduits 29 which extend through the plug member 25 and in the present invention are illustrated as two in number and in spaced relation with each other.

It will be understood that upon the suction stroke the piston the incoming fluid compresses the spring 28 so as to permit the valve 24 to become unseated thereby supplying fluid or air through the port or conduits 20, 21 and 22 to the chamber 18 and to the pump cylinder 10 by means of the conduits or supply channels 29. Simultaneously therewith the chamber 17 receives a supply of fluid through the port or channel 19. Upon the compression stroke of the piston the valve member 24 becomes seated, thereby closing said pump cylinder and retaining within the same the fluid received during the suction stroke. As the piston continues its compressional movement, the pressure of the fluid is increased and the volume, of course, is decreased, but simultaneously with the increase in pressure in the pump cylinder 10 said pressure increases in the chamber 18 since said chamber in the present embodiment is in free communication with the pump cylinder. The increased pressure, as heretofore described, expands the piston ring means to form a leak proof joint between said piston and cylinder.

While the invention has been described in considerable detail it will be understood that many modifications thereof will readily suggest themselves to those skilled in the art, a few of which have been suggested or described in the foregoing specification, but the invention thereof is not to be limited by the details of description but reference is to be had to the appended claims.

The invention claimed is:

1. A pump construction including a cylinder, a piston having a chambered body portion, expansible packing means seatable in said piston body portion and bearable on said cylinder, means for introducing fluid into said chambered body portion to expand said packing means into contact with the cylinder upon one stroke of the piston, including valve means for supplying fluid upon the return stroke of the piston to said chambered body portion and closing upon the first mentioned stroke of said piston, and plug means associated with said piston and having a channel therein providing communication between said chambered body portion and said pump cylinder, said valve means being provided with a valve stem and said plug means slidably supporting said valve stem.

2. A pump construction including a cylinder, a piston having a chambered body portion, expansible packing means seatable in said piston body portion and bearable on said cylinder, means for introducing fluid into said chambered body portion to expand said packing means into contact with the cylinder upon one stroke of the piston, including valve means for supplying fluid to the chamber upon the return stroke of the piston, said valve means being provided with stem means extending into said chamber, yielding means associated with said valve means for normally maintaining said valve means in position, and means associated with said piston and the chamber therein for providing a communication between said chamber and the pump cylinder, for slidably supporting said valve stem means, and for securing said yielding means in position adjacent said valve means.

3. A pump construction including a cylinder, a piston having a chambered body portion, expansible packing means seatable in said piston body portion and bearable on said cylinder, means for introducing fluid into said chambered body portion to expand said packing means into contact with the cylinder upon one stroke of the piston, including a supply channel communicating with the chamber, valve means controlling said supply channel, valve stem means extending into the chamber, yielding means associated with the valve means for normally maintaining said valve means in closed position, means associated with said piston and the chamber therein for providing a communication between said chamber and said pump cylinder and for slidably supporting said valve stem means and for securing said yielding means in position adjacent said valve means, and a channeled piston rod, the channel means in said piston rod communicating with a source of fluid supply and adapted to communicate with said supply channel.

In witness whereof I have hereunto affixed my signature.

WILLIAM M. CARLIN.